United States Patent Office 3,632,627
Patented Jan. 4, 1972

3,632,627
GLYCERIDE DERIVATIVES OF
PROSTAGLANDINS
Maxwell Gordon, Philadelphia, Pa., and Jerry A. Weisbach, Cherry Hill, N.J., assignors to Smith Kline & French Laboratories, Philadelphia, Pa.
No Drawing. Filed Jan. 5, 1968, Ser. No. 695,832
Int. Cl. C07c 69/74
U.S. Cl. 260—468 R                            4 Claims

ABSTRACT OF THE DISCLOSURE

The half life of prostaglandins in the blood is prolonged by administering the prostaglandin as a glyceride or phosphatide derivative. The glyceride and phosphatide derivatives of prostaglandins are prepared (1) by reacting a glycerol or glycerophosphoric acid compound with a prostenoic acid which has hydroxy groups protected and then removing the hydroxy-protecting groups or (2) biosynthetically by reacting a prostenoic acid with a glycerol or glycerophosphoric acid compound.

This invention relates to new glyceride and phosphatide derivatives of prostaglandins.

Prostaglandins are known to have various physiological properties. Science 157:382–391 (1967); Experientia 21:113–118 (1965); Acta physiol. scand. 69:320–326 (1967). For example, prostaglandins inhibit and reverse blood platelet adhesiveness and aggregation which is the initial step in thrombosis. Prostaglandins, Proc. 2nd Nobel Symposium, Stockholm, Edited by S. Bergstrom and B. Samuelsson, pps. 241–245 (Almqvist and Wiksell, Uppsala, Sweden). Also, prostaglandins lower blood pressure. Prostaglandins, however, have a short half life in the blood of about 10 minutes. By means of this invention, the half life of prostaglandins is prolonged. A half life of 4 to 8 hours of prostaglandins in the blood is obtained by using the glyceride and phosphatide derivatives thereof which are the objects of this invention. Thus, when the prostaglandin derivatives of this invention are administered in the same way as the prostaglandins themselves are administered, the physiological effects of the prostaglandin are available over longer, more useful periods of time.

The prostaglandins are C-20 organic acids, with $C_8$ to $C_{12}$ closed to form a five membered ring, and are named herein as derivatives of prostanoic acid which has the following structure:

prostanoic acid

Using this nomenclature, prostaglandins of the PGE, PGF, PGA and PGB series, the glyceride and phosphatide derivatives of which are the particular objects of this invention, are named as follows:

PGE$_1$: 11α,15α-dihydroxy-9-keto-13-prostenoic acid
PGE$_2$: 11α,15α-dihydroxy-9-keto-5,13-prostadienoic acid
PGE$_3$: 11α, 15α-dihydroxy-9-keto-5,13,17-prostatrienoic acid
PGF$_1$: 9α,11α, 15α-trihydroxy-13-prostenoic acid
PGF$_2$: 9α,11α, 15α-trihydroxy-5,13-prostadienoic acid
PGA$_1$: 15α-hydroxy-9-keto-10,13-prostadienoic acid
PGA$_2$: 15α-hydroxy-9-keto-10,13,17-prostatrienoic acid
PGB$_1$: 15α-hydroxy-9-keto-8,13-prostadienoic acid
PGB$_2$: 15α-hydroxy-9-keto-8,13,17-prostatrienoic acid The prostaglandin glyceride and phosphatide derivatives of this invention are represented by the following formula:

Formula I $$CH_2-O-R_1$$
$$CH-O-R_2$$
$$CH_2-O-R_3$$

in which:

R$_1$, R$_2$ and R$_3$ are hydrogen, stearoyl, palmitoyl, $$-\overset{OH}{\underset{\underset{O}{\|}}{P}}-O-R_4, \quad -\overset{O^\ominus}{\underset{\underset{O}{\|}}{P}}-O-R_5$$

or R$_6$, at least one of R$_1$, R$_2$ and R$_3$ being R$_6$;
R$_4$ is hydrogen or (inositol group: HO, OH, OH, HO, OH)

R$_5$ is $$-CH_2CH_2\overset{\oplus}{N}H_3, \quad -CH_2CH_2\overset{\oplus}{N}(CH_3)_3 \text{ or } -CH_2\underset{\underset{\oplus}{NH_3}}{CH}COOH$$

R$_6$ is (cyclopentane ring with) OH
—CH=CH—CH—CH$_2$—X—CH$_2$CH$_3$
—CH$_2$—Y—(CH$_2$)$_3$—C—
                              ‖
                              O —CH=CH—CH—(CH$_2$)$_4$—CH$_3$
                  OH
—CH$_2$—Y′—(CH$_2$)$_3$—C— or
                              ‖
                              O —CH=CH—CH—(CH$_2$)$_4$CH$_3$
                  OH
—CH$_2$—Y′—(CH$_2$)$_3$—C—
                              ‖
                              O X is CH$_2$CH$_2$ and Y is CH$_2$CH$_2$ or CH=CH or X is CH=CH and Y is CH=CH;
Y′ is CH$_2$CH$_2$ or CH=CH; and
Z is C=O or, when X is CH$_2$CH$_2$, $\underset{OH}{CH}$ The compounds of Formula I are prepared by reacting a glycerol or glycerophosphoric acid compound with a prostenoic acid, which has hydroxy groups protected, for example, with t-butoxycarbonyl or trichloroethoxycarbonyl. The reaction is carried out in a solvent such as dry pyridine or lutidine and in the presence of dicyclohexylcarbodiimide. The hydroxy-protecting groups are then removed. The t-butoxycarbonyl group is preferably removed by treating with hydrogen chloride in a dry hydrocarbon solvent such as benzene. The trichloroethoxycarbonyl group is preferably removed by treating with zinc and acetic acid.

Alternatively, the compounds of this invention are prepared biosynthetically by reacting a prostenoic acid with a glycerol or glycerophosphoric acid compound using phospholipase and cofactors. By this method the prostaglandin glycerides and phosphatides of this invention are prepared without using protecting groups on the hydroxy groups of the prostenoic acids.

The products are purified by chromatography using, for example, Florisil (magnesia-silica gel absorbent).

3

Other prostaglandins may be converted by the procedures described above to the glyceride and phosphatide derivatives by use of which half life of the prostaglandins in the blood is prolonged.

The following examples are not limitng but are illustrative of the compounds of this invention and methods of preparing them.

EXAMPLE 1

A solution of 0.356 g. of 9α,11α,15α-trihydroxy-13-prostenoic acid in 10 ml. of dry pyridine is treated with 0.4 g. of t-butoxycarbonyl chloride in 10 ml. of dry pyridine at room temperature and the resulting mixture is allowed to stand overnight with stirring. The pyridine is removed in vacuo and the residue is chromatographed on Florisil to give 9α,11α,15α-tris-t-butoxycarbonyloxy-13-prostenoic acid.

Nine grams of glycerol is reacted with 27.3 g. of t-butoxycarbonyl chloride in 100 ml. of dry pyridine at room temperature for four hours. The solvent is removed and the product chromatographed on Florisil to give 1,3-bis-t-butoxycarbonyl glyceride.

A solution of 0.65 g. of 9α,11α,15α-tris-t-butoxycarbonyloxy-13-prostenoic acid in 5 ml. of dry pyridine is treated with 0.3 g. of 1,3-bis-t-butoxycarbonyl glyceride in 5 ml. of dry pyridine and 0.2 of dicyclohexylcarbodiimide in 5 ml. of dry pyridine. The resulting mixture is stirred overnight. The pyridine is removed in vacuo and the residue is chromatographed on Florisil. In the chromatography 120 mg. of residue is put on a Florisil column 1.3 cm. in diameter and 22 cm. in length containing 12 g. of Florisil deactivated with deionized water. The residue is put on the column in 100 ml. of 15% diethyl ether in hexane, and successive elutions are carried out with 50% ether in hexane and with 3% methanol in ether. The product is 1,3-bis-t-butoxycarbonyl-2-(9α,11α,15α-tris-butoxycarbonyloxy-13-prostenoyl) glyceride.

A solution of 0.83 g. of 1,3-bis-t-butoxycarbonyl-2-(9α,11α,15α-tris-t-butoxycarbonyloxy-13-prostenoyl) glyceride in 10 ml. of benzene is treated with 0.18 g. of hydrogen chloride in benzene for four hours at room temperature. The solvent is evaporated and the product chromatographed on Florisil to give 2-(9α,11α,15α-trihydroxy-3-prostenoyl) glyceride.

Similarly, using 0.354 g. of 11α,15α-dihydroxy-9-keto-13-prostenoic acid in place of 9α,11α,15α-trihydroxy-13-prostenoic acid in the above procedure, 2-(11α,15α-dihydroxy-9-keto-13-prostenoyl) glyceride is obtained.

EXAMPLE 2

A solution of 0.35 g. of 9α,11α,15α-trihydroxy-5,13-prostadienoic acid in 5 ml. of dry pyridine is treated with 0.64 g. of trichloroethoxycarbonyl chloride in 5 ml. of dry pyridine at room temperature and the resulting mixture is allowed to stand overnight. The pyridine is removed in vacuo and the residue is chromatographed on Florisil to give 9α, 11α,15α-tris-trichloroethoxycarbonyloxy-5,13-prostadienoic acid.

A solution of 0.88 g. of 9α,11α,15α-tris-trichloroethoxycarbonyloxy-5,13-prostadienoic acid in 10 ml. of dry pyridine is treated with 0.21 g. of dicyclohexylcarbodiimide and 0.1 g. of glycerol in 10 ml. of dry pyridine. The reaction mixture is stirred overnight at room temperature and the solvent is then removed in vacuo. The residue is chromatographed on Florisil to give 1-(9α,11α,15α-tris-trichloroethoxycarbonyloxy-5,13-prostadienoyl) glyceride.

A solution of 0.95 g. of 1-(9α,11α,15α-tris-trichloroethoxycarbonyloxy-5,13-prostadienoyl) glyceride in 10 ml. of benzene is treated with 0.4 g. of zinc and 0.5 ml. of glacial acetic acid in 10 ml. of benzene. The mixture is stirred for four hours at room temperature, filtered, the filter washed with benzene and the solvent removed in vacuo. The residue is chromatographed on Florisil as described in Example 1 to give 1-(9α,11α,15α-trihydroxy-5,13-prostadienoyl) glyceride.

EXAMPLE 3

A solution of 1.3 g. of 9α,11α,15α-tris-t-butoxycarbonyloxy-13-prostenoic acid (prepared as in Example 1) in 10 ml. of dry pyridine is treated with 0.43 g. of dicyclohexylcarbodiimide and 0.1 g. of glycerol in 10 ml. of dry pyridine. The reaction mixture is stirred overnight at room temperature and the solvent is removed in vacuo. The residue is chromatographed on Florisil to give 1,3-bis(9α,11α,15α-tris-t-butoxycarbonyloxy-13-prostenoyl) glyceride.

A solution of 1.3 g. of 1,3-bis(9α,11α,15α-tris-t-butoxycarbonyloxy-13-prostenoyl) glyceride in 10 ml. of benzene is treated with 0.1 g. of hydrogen chloride in benzene for four hours at room temperature. The solvent is evaporated and the product is chromatographed on Florisil as described in Example 1 to give 1,3-bis(9α,11α,15α-trihydroxy-13-prostenoyl) glyceride.

EXAMPLE 4

A solution of 0.356 g. of 9β,11α,15α-trihydroxy-13-prostenoic acid in 10 ml. of dry pyridine is treated with 0.64 g. of trichloroethoxycarbonyl chloride in 5 ml. of dry pyridine at room temperature. The mixture is allowed to stand overnight. The pyridine is removed in vacuo and the residue is chromatographed on Florisil to give 9β,11α,15α-tris trichloroethoxycarbonyloxy - 13-prostenoic acid.

A solution of 0.88 g. of 9β,11α,15α-tris-trichloroethoxycarbonyloxy-13-prostenoic acid in dry pyridine is treated with 0.21 g. of dicyclohexylcarbodiimide and 0.58 g. of 1,3-dipalmitoyl glyceride in 10 ml. of dry pyridine. The reaction mixture is stirred overnight at room temperature and the solvent is then removed in vacuo. The residue is chromatographed on Florisil to give 1,3-(dipalmitoyl)-2-(9β,11α,15α-tris-trichloroethoxycarbonyloxy-13-prostenoyl) glyceride.

A solution of 1.44 g. of 1,3-(dipalmitoyl)-2-(9β,11α, 15α-tris-trichloroethoxybonyloxy - 13-prostenoyl) glyceride in 10 ml. of benzene is treated with 0.4 g. of zinc and 0.5 ml. of glacial acetic acid. The mixture is stirred for four hours at room temperature, then filtered, the filter is washed with benzene and the solvent is removed in vacuo. The residue is chromatographed on Florisil as described in Example 1 to give 1,3-(dipalmitoyl)-2-(9β,11α,15α-trihydroxy-13-prostenoyl) glyceride.

EXAMPLE 5

A solution of 1 g. of (stearoyl) lecithin is treated with 0.5 g. of phospholipase A [cf. Brown et al., J. Chem. Soc., 4232–4235 (1960)] at 25° C. in 100 ml. of sodium phosphate buffer and the product is chromatographed on Florisil to give (stearoyl) lysolecithin.

A solution of 0.523 g. of (stearoyl) lysolecithin and 0.67 g. of 9α,11α,15α-tris-t-butoxycarbonyloxy-13-prostenoic acid (prepared as in Example 1) in 10 ml. of dry pyridine is mixed with 0.21 g. of dicyclohexylcarbodiimide and the resulting mixture is stirred overnight at room temperature. The solvent is removed in vacuo and the product chromatographed on Florisil to give (1-stearoyl)-2 - (9α,11α,15α - tris-t-butoxycarbonyloxy-13-prostenoyl) lysolecithin.

The above prepared compound is treated with 3 moles of hydrogen chloride in dry benzene to give, after removing the solvent and chromatographing on Florisil, (1-stearoyl)-2-(9α,11α,15α-trihydroxy - 13 - prostenoyl) lysolecithin.

EXAMPLE 6

A solution of 0.35 g. of 11α,15α-dihydroxy-9-keto-13-prostenoic acid in 5 ml. of dry pyridine is treated with 0.43 g. of trichloroethoxycarbonyl chloride in 5 ml. of dry pyridine at room temperature and the resulting mixture is allowed to stand overnight with stirring. The pyridine is removed in vacuo and the residue is chromatographed on Florisil to give 9-keto-11α,15α,bis-trichloroethoxycarbonyloxy-13-prostenoic acid.

A solution of 0.7 g. of 9-keto-11α,15α-bis-trichloroethoxycarbonyloxy-13-prostenoic acid in 10 ml. of dry pyridine is treated with 0.523 g. of (stearoyl) lysolecithin (prepared as in Example 5) and 0.21 g. of dicyclohexylcarbodiimide in 10 ml. of dry pyridine. The reaction mixture is stirred overnight at room temperature and the solvent is removed in vacuo. The residue is chromatographed on Florisil to give 2-(9-keto-11α,15α-bis-trichloroethoxycarbonyloxy - 13 - prostenoyl)-(1-stearoyl) lysolecithin.

A solution of 1.21 g. of 2-(9-keto-11α,15α-bis-trichloroethoxycarbonyloxy-13-prostenoyl) - (1 - stearoyl) lysolecithin in 10 ml. of benzene is treated with 0.25 g. of zinc and 0.3 ml. of glacial acetic acid in 10 ml. of benzene. The mixture is stirred for eight hours at room temperature, filtered, the filter is washed with benzene and the solvent is removed in vacuo. The residue is chromatographed on Florisil as described in Example 1 to give 2-(11α,15α - dihydroxy-9-keto-13-prostenoyl)-(1-stearoyl) lysolecithin.

EXAMPLE 7

A solution of 0.35 g. of 11α,15α-dihydroxy-9-keto-5,13-prostadienoic acid in 10 ml. of dry pyridine is treated with 0.28 g. of t-butoxycarbonyl azide in 10 ml. of dry pyridine at room temperature and the resulting mixture is allowed to stand overnight with stirring. The pyridine is removed in vacuo and the residue is chromatographed on Florisil to give 11α,15α-bis-t-butoxycarbonyloxy-9-keto-5,13-prostenoic acid.

A solution of 0.55 g. of 11α,15α-bis-t-butoxycarbonyloxy-9-keto-5,13-prostadienoic acid in 5 ml. of dry pyridine is treated with 0.17 g. of 3-glycerophosphoric acid and 0.21 g. of dicyclohexylcarbodiimide in 5 ml. of dry pyridine. The reaction mixture is stirred overnight and then the pyridine is removed in vacuo and the residue is chromatographed on Florisil to give 1-(11α,15α,bis-t-butoxycarbonyloxy - 9 - keto - 5,13 - prostadienoyl) - 3-glycerophosphate.

1-(11α,15α,bis-t-butoxycarbonyloxy-9-keto - 5,13 - prostadienoyl)-3-glycerophosphate (0.71 g.) in 10 ml. of benzene is treated with 0.1 g. of hydrogen chloride in benzene for eight hours at room temperature. The solvent is evaporated and the product chromatographed on Florisil to give 1-(11α,15α-dihydroxy-9-keto-5,13-prostadienoyl)-3-glycerophosphate.

EXAMPLE 8

A solution of 17.2 g. of 3-glycerophosphoric acid is reacted with 14.3 g. of t-butoxycarbonyl azide in 100 ml. of dry pyridine at room temperature for eight hours. The solvent is removed and the product chromatographed on Florisil to give 1-t-butoxycarbonyl-3-glycerophosphate.

11α,15α-dihydroxy-9-keto - 5,13,17 - prostatrienoic acid (0.35 g.) in 10 ml. of dry pyridine is reacted with 0.28 g. of t-butoxycarbonyl azide in 10 ml. of dry pyridine with stirring at room temperature overnight. The pyridine is removed in vacuo and the residue is chromatographed on Florisil to give 11α,15α-bis-t-butoxycarbonyloxy-9-keto-5,13,17-prostatrienoic acid.

A mixture of 0.27 g. of 1-t-butoxycarbonyl-3-glycerophosphate in 10 ml. of dry pyridine and 0.55 g. of 11α,15α-bis-t-butoxycarbonyloxy-9-keto-5,13,17-prostatrienoic acid in 10 ml. of pyridine is treated with 0.21 g. of dicyclohexylcarbodiimide. The mixture is stirred overnight at 0° C. The solvent is removed in vacuo and the product is chromatographed on Florisil to give 1-(t-butoxycarbonyl)-2-(11α,15α - bis-t-butoxycarbonyloxy-9-keto-5,13,17-prostatrienoyl)-3-glycerophosphate.

1 - (t - butoxycarbonyl) - 2 - (11α,15α-bis-t-butoxycarbonyloxy-9-keto-5,13,17-prostatrienoyl) - 3 - glycerophosphate (0.81 g.) is treated with 0.1 g. of hydrogen chloride and benzene for six hours at room temperature. The solvent is evaporated and the product chromatographed on Florisil to give 2-(11α,15α-dihydroxy-9-keto-5,13,17-prostatrienoyl)-3-glycerophosphate.

EXAMPLE 9

A solution of 0.336 g. of 15α-hydroxy-9-keto-10,13-prostadienoic acid in 10 ml. dry pyridine is treated with 0.14 g. of t-butoxycarbonyl chloride in 5 ml. of dry pyridine. The mixture is stirred overnight at 0° C. and then the pyridine is removed in vacuo. The residue is chromatographed on silica gel to give 15α-t-butoxycarbonyloxy-9-keto-10,13-prostadienoic acid.

To 0.436 g. of 15α-t-butoxycarbonyloxy-9-keto-10,13-prostadienoic acid in 5 ml. of dry pyridine is added 0.29 g. of 1,3-bis-t-butoxycarbonyl glyceride (prepared as in Example 1) in 5 ml. of dry pyridine and 0.21 g. of dicyclohexylcarbodiimide in 5 ml. of dry pyridine. The mixture is stirred overnight at room temperature. The solvent is removed in vacuo and the product chromatographed on Florisil to give 1,3-(bis-t-butoxycarbonyl)-2-(15α-t-butoxycarbonyloxy - 9 - keto-10,13-prostadienoyl) glyceride.

1,3-(bis-t-butoxycarbonyl) - 2 - (15α-t-butoxycarbonyloxy-9-keto-10,13-prostadienyl) glyceride (0.71 g.) in 10 ml. of benzene is treated with 0.1 g. of hydrogen chloride in benzene for six hours at room temperature. The solvent is evaporated and the product is chromatographed on Florisil as described in Example 1 to give 2-(15α-hydroxy-9-keto-10,13-prostadienoyl) glyceride.

Similarly, using 0.334 g. of 15α-hydroxy-9-keto-5,10,13-prostatrienoic acid in place of 15α-hydroxy-9-keto-10,13-prostadienoic acid in the above procedure, 2-(15α-hydroxy-9-keto - 5,10,13 - prostatrienoyl) glyceride is obtained.

EXAMPLE 10

To 0.336 g. of 15α-hydroxy-9-keto-8,13-prostadienoic acid in 10 ml. of dry pyridine is added 0.14 g. of t-butoxycarbonyl chloride in 5 ml. of dry pyridine. The mixture is stirred overnight at 30° C., then the solvent is removed in vacuo. The residue is chromatographed on Florisil to give 15α-t-butoxycarbonyloxy-9-keto-8,13-prostadienoic acid.

To 0.436 g. of 15α-t-butoxycarbonyloxy-9-keto-8,13-prostadienoic acid in 10 ml. of dry pyridine is added 0.21 g. of dicyclohexylcarbodiimide and 0.1 g. of glycerol in 5 ml. of pyridine. The mixture is stirred at 0° C. for eighteen hours and the solvent is removed in vacuo. The residue is chromatographed on Florisil to give 1-(15α-t-butoxycarbonyloxy-9-keto-8,13-prostadienoyl) glyceride.

1-(15α-t-butoxycarbonyloxy-9-keto-8,13-prostadienoyl) glyceride (0.401 g.) in 10 ml. of benzene is treated with 0.03 g. of hydrogen chloride in benzene for four hours at room temperature. The solvent is evaporated and the product is chromatographed on Florisil as described in Example 1 to give 1-(15α-hydroxy-9-keto-8,13-prostadienoyl) glyceride.

Similarly, using 0.334 g. of 15α-hydroxy-9-keto-5,8,13-prostatrienoic acid in place of 15α-hydroxy-9-keto-8,13-prostadienoic acid in the above procedure, 1-(15α-hydroxy-9-keto-5,8,13-prostatrienoyl) glyceride is obtained.

EXAMPLE 11

9 - keto - 11α,15α-bis-trichloroethoxycarbonyloxy-13-prostenoic acid (0.71 g.), prepared as in Example 6, in 10 ml. of dry pyridine is treated with 0.292 g. of 1,3-bis-t-butoxycarbonyl glyceride, prepared as in Example 1, and 0.21 g. of dicyclohexylcarbodiimide in 10 ml. of dry pyridine and the resulting mixture is stirred overnight at room temperature. The pyridine is removed in vacuo and the residue is chromatographed on Florisil to give 1,3-bis-t-butoxycarbonyl - 2-(9-keto-11α,15α-bis-trichloroethoxycarbonyloxy-13-prostenoyl) glyceride.

1,3 - bis-t-butoxycarbonyl - 2-(9-keto-11α,15α-bis-trichloroethoxycarbonyloxy-13-prostenoyl) glyceride (0.98 g.) in 10 ml. of benzene is treated with 0.7 g. of hydrogen chloride in benzene. The mixture is stirred for six hours at room temperature. The solvent is evaporated and the product chromatographed on Florisil to give 2-(9-keto-11α,15α-bis-trichloroethoxycarbonyl-13-prostenoyl) glyceride.

2 - (9 - keto-11α,15α-bis-trichloroethoxycarbonyloxy-13-prostenoyl) glyceride (0.78 g.) in 10 ml. of dry pyridine is treated with 0.3 g. of palmitoyl chloride in 10 ml. of dry pyridine. The mixture is allowed to stand at room temperature for four hours. The solvent is removed in vacuo and the residue is chromatographed on Florisil to give 2 - (9-keto-11α,15α-bis-trichloroethoxycarbonyloxy-13-prostenoyl)-1-palmitoyl glyceride.

2 - (9 - keto-11α,15α-bis-trichloroethoxycarbonyloxy-13-prostenoyl)-1-palmitoyl glyceride (1.04 g.) in 10 ml. of dry benzene is treated with 0.3 g. of zinc and 0.4 ml. of glacial acetic acid in 10 ml. of dry benzene. The mixture is stirred for six hours at room temperature, filtered, the filter is washed with benzene and then the solvent is removed from the filtrate in vacuo. The residue is chromatographed on Florisil as described in Example 1 to give 2 - (11α,15α - dihydroxy-9-keto-13-prostenoyl)-1-palmitoyl glyceride.

EXAMPLE 12

A solution of 1.04 g. of 2-(9-keto-11α,15α-bis-trichloroethoxycarbonyloxy-13-prostenoyl)-1-palmitoyl glyceride, prepared as in Example 11, in 10 ml. of dry pyridine is treated with 0.256 g. of palmitic acid and 0.21 g. of dicyclohexylcarbodiimide in 10 ml. of dry pyridine. The reaction mixture is stirred overnight at room temperature. The solvent is removed in vacuo and the product is chromatographed to give 2-(9-keto-11α,15α-bis-trichloroethoxycarbonyloxy - 13-prostenoyl)-1,3-dipalmitoyl glyceride.

9 - (9-keto-11α,15α-bis-trichloroethoxycarbonyloxy-13-prostenoyl)-1,3-dipalmitoyl glyceride (1.28 g.) in 10 ml. of benzene is treated with 0.3 g. of zinc and 0.4 ml. of glacial acetic acid in 10 ml. of dry benzene. The mixture is stirred for four hours at room temperature, filtered, the filter is washed with benzene and the solvent is removed from the filtrate in vacuo. The residue is chromatographed on Florisil as described in Example 1 to give 2-(11α,15α-dihydroxy - 9 - keto-13-prostenoyl)-1,3-dipalmitoyl glyceride.

EXAMPLE 13

A solution of 0.593 g. of 2-palmitoyl glyceride (prepared by reacting palmitoyl chloride with 1,3-di-t-butoxycarbonyl glyceride, prepared as in Example 1, and removing the t-butoxycarbonyl groups by treating with hydrogen chloride in benzene as in Example 1) and 0.71 g. of 9-keto-11α,15α-bis-trichloroethoxycarbonyloxy-13-prostenoic acid (prepared as in Example 6) in 10 ml. of dry pyridine is treated with 0.21 g. of dicyclohexylcarbodiimide in 10 ml. of dry pyridine and the reaction mixture is stirred overnight at room temperature. The pyridine is removed in vacuo and the product chromatographed on Florisil to give 1-(9-keto-11α,15α-bis-trichloroethoxycarbonyloxy - 13 - prostenoyl)-2-palmitoyl glyceride.

To 1.28 g. of 1-(9-keto-11α,15α-bis-trichloroethoxycarbonyloxy-3-prostenoyl)-2-palmitoyl glyceride and 10 ml. of dry benzene is added 0.2 g. of zinc and 0.2 ml. of glacial acetic acid in 10 ml. of benzene. The mixture is stirred for three hours at room temperature, filtered, the filter is washed with benzene and the solvent is removed from the filtrate in vacuo. The residue is chromatographed on Florisil as described in Example 1 to give 1 - (11α,15α-dihydroxy-9-keto-13-prostenoyl)-2-palmitoyl glyceride.

EXAMPLE 14

9-keto - 11α,15α - bis - trichloroethoxycarbonyloxy-13-prostenoic acid (0.71 g.), prepared as in Example 6, in 10 ml. of dry pyridine is treated with 0.1 g. of glycerol and 0.21 g. of dicyclohexylcarbodiimide in 10 ml. of dry pyridine. The mixture is stirred at room temperature overnight and the pyridine is evaporated in vacuo. The residue is chromatographed on Florisil to give 1-(9-keto-11α,15α-bis-trichloroethoxycarbonyloxy-13-prostenoyl) glyceride.

A mixture of 0.78 g. of 1-(9-keto-11α,15α-bis-trichloroethoxycarbonyloxy-3-prostenoyl) glyceride, 0.256 g. of palmitic acid, 0.21 g. of dicyclohexylcarbodiimide and 20 ml. of dry pyridine is stirred overnight at room temperatures. The solvent is removed in vacuo and the residue is chromatographed on Florisil to give 1-(9-keto-11α,15α-bis-trichloroethoxycarbonyloxy - 13-prostenoyl)-3-palmitoyl glyceride.

1-(9-keto - 11α,15α - bis - trichloroethoxycarbonyloxy-13-prostenoyl)-3-palmitoyl glyceride (1.02 g.) in 10 ml. of dry benzene is treated with 0.3 g. of zinc and 0.4 ml. of glacial acetic acid in 10 ml. of dry benzene. The mixture is stirred for six hours at room temperature, filtered, the filter washed with benzene and the solvent removed from the filtrate in vacuo. The residue is chromatographed on Florisil as described in Example 1 to give 1-(11α,15α-dihydroxy-9-keto - 13 - prostenoyl)-3-palmitoyl glyceride.

EXAMPLE 15

1-(9-keto - 11α,15α - bis - trichloroethoxycarbonyloxy-13-prostenoyl)-3-palmitoyl glyceride (1.02 g.), prepared as in Example 14, in 10 ml. of pyridine is reacted with 0.256 g. of palmitic acid and 0.21 g. of dicyclohexylcarbodiimide in 10 ml. of pyridine. The mixture is stirred overnight at room temperature. The solvent is removed in vacuo and the product chromatographed on Florisil to give 1-(9-keto-11α,15α-bis-trichloroethoxycarbonyloxy-3-prostenoyl)-2,3-dipalmitoyl glyceride.

1-(9-keto - 11α,15α - bis - trichloroethoxycarbonyloxy-13-prostenoyl)-2,3-dipalmitoyl glyceride (1.26 g.) in 10 ml. of benzene is treated with 0.3 g. of zinc and 0.4 ml. of glacial acetic acid in 19 ml. of benzene. The mixture is stirred for six hours at room temperature, filtered, the filter is washed with benzene and the solvent is removed from the filtrate in vacuo. The residue is chromatographed on Florisil as described in Example 1 to give 1-(11α,15α-dihydroxy-9-keto - 13 - prostenoyl)-2,3-dipalmitoyl glyceride.

EXAMPLE 16

2-(9-keto - 11α,15α - bis - trichloroethoxycarbonyloxy-13-prostenoyl) glyceride (0.78 g.), prepared as in Example 11, in 10 ml. of dry pyridine is treated with 0.71 g. of 9-keto - 11α,15α - bis-trichloroethoxycarbonyloxy - 13-prostenoic acid, prepared as in Example 6, and 0.21 g. of dicyclohexylcarbodiimide in 10 ml. of dry pyridine. The mixture is stirred overnight at room temperature. The solvent is removed in vacuo and the product is chromatographed on Florisil to give 1,2-bis(9-keto-11α,15α-bis-trichloroethoxycarbonyloxy-13-prostenoyl) glyceride.

1,2-bis-(9-keto - 11α,15α - bis-trichloroethoxycarbonyloxy-13-prostenoyl) glyceride (1.47 g.) in 10 ml. of benzene is treated with 0.5 g. of zinc and 2.6 ml. of glacial acetic acid in 10 ml. of dry benzene and the mixture is stirred for eight hours at room temperature. The mixture is filtered, the filter washed with benzene and the solvent removed from the filtrate in vacuo. The residue is chromatographed on Florisil as described in Example 1 to give 1,2-bis(11α,15α-dihydroxy - 9 - keto-13-prostenoyl) glyceride.

EXAMPLE 17

A solution of 0.49 g. of (stearoyl) lysophosphatidyl serine and 0.66 g. of 9α,11α,15α-tris-t-butyloxycarbonyloxy-13-prostenoic acid (prepared as in Example 1) in 20 ml. of dry pyridine is treated with 0.21 g. of dicyclohexylcarbodiimide to give, after removing the solvent and chromatographing on Florisil, (1-stearoyl) - 2 - (9α,11α,15α-tris-t-butyloxycarbonyloxy - 13-prostenoyl) lysophosphatidyl serine.

The above prepared compound is treated with 3 moles of hydrogen chloride in dry benzene to give, after removing the solvent and chromatographing on Florisil, (1-stearoyl)-2-(9α,11α,15α-trihydroxy - 13-prostenoyl) lysophosphatidyl serine.

EXAMPLE 18

A solution of 0.59 g. of (stearoyl) lysophosphatidyl inositol and 0.66 g. of 9α,11α,15α-tris-t-butoxycarbonyloxy-13-prostenoic acid (prepared as in Example 1) in 20 ml. of dry pyridine is treated with 0.21 g. of dicyclohexylcarbodiimide to give, after removing the solvent and chromatographing on Florisil, (1-stearoyl)-2-(9α,11α,15α-tris-t-butoxycarbonyloxy-13-prostenoyl) lysophosphatidyl inositol.

The above prepared compound is treated with 3 moles of hydrogen chloride in dry benzene to give, after removing the solvent and chromatographing on Florisil, (1-stearoyl)-2-(9α,11α,15α-trihydroxy-11 - prostenoyl) lysophosphatidyl inositol.

EXAMPLE 19

A mixture of 0.48 g. of (stearoyl) lysophosphatidyl ethanolamine, 0.35 g. of 9 - keto - 11α,15α - dihydroxy-13-prostenoic acid, 10 g. of liver homogenate in 100 ml. of phosphate buffer, 100 ml. of phospholipase and 50 mg. of adenosine-tri-phosphate is incubated at 35° C. for twelve hours. The reaction mixture is freeze-dried, desalted by electrolysis, and chromatographed on Florisil to give 2-(11α,15α-dihydroxy-9-keto - 13 - prostenoyl)-(1-stearoyl) lysophosphatidyl ethanolamine.

EXAMPLE 20

1,2-bis(9-keto - 11α,15α - bis-trichloroethoxycarbonyloxy-13-prostenoyl) glyceride (1.47 g.), prepared as in Example 16, in 15 ml. of dry pyridine is treated with 0.71 g. of 9-keto - 11α,15α-bis-trichloroethoxycarbonyloxy-13-prostenoic acid, prepared as in Example 6, and 0.21 g. of dicyclohexylcarbodiimide in 10 ml. of dry pyridine. The resulting mixture is stirred overnight at room temperature and worked up as in Example 16 to give 1,2,3-tris(9-keto-11α,15α-bis-trichloroethoxycarbonyloxy - 13-prostenoyl) glyceride.

Zinc (0.5 g.) and 2.6 ml. of glacial acetic acid in 10 ml. of dry benzene are added to 2.16 g. of the above prepared glyceride in 10 ml. of benzene and the mixture is stirred for eight hours at room temperature. Working up as in Example 16 gives 1,2,3-tris(11α,15α-dihydroxy-9-keto-13-prostenoyl) glyceride.

What is claimed is:
1. A compound of the formula:

$$\begin{array}{l} CH_2-O-R_1 \\ CH-O-R_2 \\ CH_2-O-R_3 \end{array}$$

in which:

$R_1$, $R_2$ and $R_3$ are hydrogen, stearoyl, palmitoyl, or $R_6$, at least one of $R_1$, $R_2$ and $R_3$ being $R_6$;

$R_6$ is

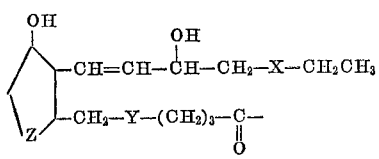

or

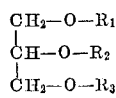

X is $CH_2CH_2$ and Y is $CH_2CH_2$ or $CH=CH$ or X is $CH=CH$ and Y is $CH=CH$;
Y' is $CH_2CH_2$ or $CH=CH$; and
Z is $C=O$ or, when X is $CH_2CH_2$, $$\begin{array}{c} CH \\ | \\ OH \end{array}$$

2. A compound according to claim 1 in which $R_1$, $R_2$ and $R_3$ are hydrogen, stearoyl, palmitoyl or $R_6$, at least one of $R_1$, $R_2$ and $R_3$ being $R_6$; $R_6$ is X is $CH_2CH_2$ and Y is $CH_2CH_2$ or $CH=CH$ or X is $CH=CH$ and Y is $CH=CH$; and Z is $C=O$ or, when X is $CH_2CH_2$, $$\begin{array}{c} CH \\ | \\ OH \end{array}$$

3. A compound according to claim 1 in which $R_1$ and $R_3$ are hydrogen, $R_2$ is $R_6$ and $R_6$ is 4. A compound according to claim 1 in which $R_1$ and $R_3$ are hydrogen, $R_2$ is $R_6$ and $R_6$ is References Cited

FOREIGN PATENTS 1,455,111  10/1966  France _____ 260—514

OTHER REFERENCES

Bergstrom: Science, July 28, 1967, pp. 382–391.
Harper: Physiological Chem., 1967, pp. 251, 482.
Mahler et al.: Biological Chem., 1966, p. 511.
Lanch et al.: Biochem. Biophys. Acta 164, 426 (1968).

LORRAINE A. WEINBERGER, Primary Examiner
R. GERSTL, Assistant Examiner

U.S. Cl. X.R.

260—403, 410.8, 463, 945, 953; 424—199, 217, 305, 312